T. H. KIP.
VEHICLE TIRE.
APPLICATION FILED MAY 18, 1921.
1,407,756.
Patented Feb. 28, 1922.
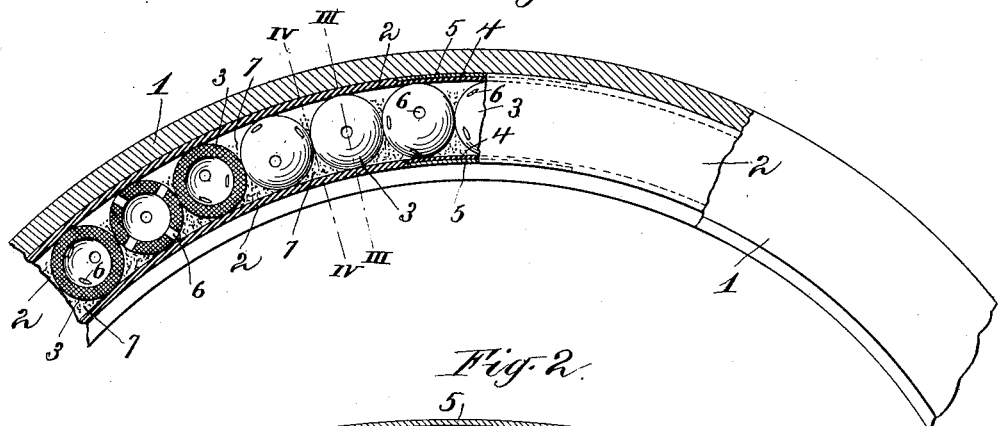
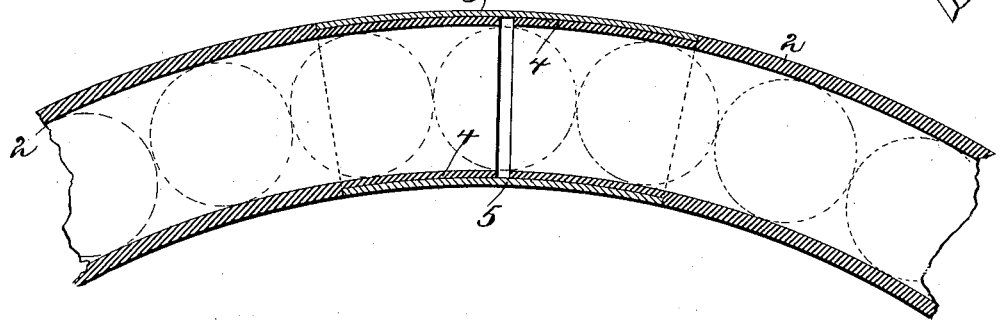
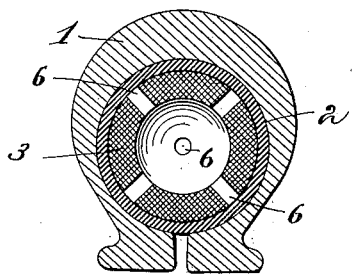
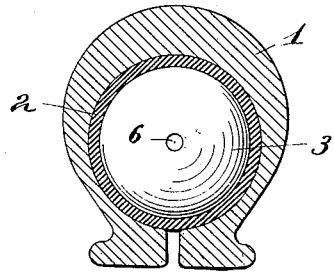
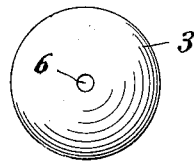
Inventor:
Thomas H. Kip.
by his attorney
Charles K. Searle

UNITED STATES PATENT OFFICE.

THOMAS H. KIP, OF NEW YORK, N. Y.

VEHICLE TIRE.

1,407,756.  Specification of Letters Patent.  Patented Feb. 28, 1922.

Application filed May 18, 1921. Serial No. 470,631.

*To all whom it may concern:*

Be it known that I, THOMAS H. KIP, a citizen of the United States, residing in the city of New York, borough of Bronx, in the county of Bronx and State of New York, have invented a certain new and useful Improvement in Vehicle Tires, of which the following is a specification.

The invention relates to tires for automobiles and like motor vehicles and more particularly to that class in which a series of balls arranged annularly in a shoe offers the desired resilience. The object of the invention is to provide a tire of simple and economical construction affording great resilience and avoiding the disadvantages of the pneumatic tire.

The invention consists in certain details of construction and arrangement by which the above objects are attained, to be hereinafter described and claimed.

The accompanying drawings form a part of this specification and show an approved form of the invention.

Figure 1 is a side view of a portion of the improved tire, certain portions being broken away for part of its length, and certain other portions being shown in section.

The remaining figures are on a larger scale.

Figure 2 is a peripheral section of the tube or carrier in which the balls are received.

Figure 3 is a transverse section through the shoe, tube, and one of the balls, taken on the line III—III in Figure 1.

Figure 4 is a similar view taken on the line IV—IV in Figure 1, between two adjacent balls.

Figure 5 is an elevation of one of the balls alone.

Referring to the drawings, 1 is a circumferential shoe which may be understood to be of any approved type adapted to be carried by a wheel, not shown, and having its interior circular in cross-section.

Received within the shoe is the annular tube or ball-carrier 2 preferably of rubber of sufficient thickness to afford the stiffness required in introducing the balls 3 to its interior. The adjacent ends of the tube are open and are reduced exteriorly to form long rebates as at 4, adapted to be received and held in a sleeve 5 by which the tubular annulus is completed.

The balls 3 are of vulcanized rubber and are introduced one after another in series within the tube 2 until the latter is filled. The diameter of each ball equals approximately the interior diameter of the tube, and the parts are so proportioned that each ball lies in contact with its neighbors on each side when the tube is filled and closed by the sleeve 5.

Each ball is hollow with thick walls to provide the required resilience and insure the return to a spherical form when relieved from the pressure due to the load in service, and each is provided with perforations 6 so arranged that all cannot be closed simultaneously by contact with the interior of the tube or with adjacent balls, and thus to insure one or more shall be open in all positions of the ball and permit the collapsed ball to assume quickly its original form by the ingress of air to its hollow interior.

As the balls are introduced successively into the tube, a dry lubricant is also introduced, preferably comminuted graphite, indicated at 7 in Figure 1, serving to lessen the friction of one ball against the next in series and between the balls and tube-wall as the balls are successively collapsed by compression and re-inflated during the revolutions of the wheel, and permit the balls to shift positions along the tube and also to rotate relatively to each other, so that the balls are free to move and transmit the strains of compression from one to the next in gradually lessening degrees, thus forming a yielding annular cushion having resilient qualities closely analogous to those of the pneumatic tire while avoiding the well-known disadvantages of the latter.

The inspiration and expiration of air by the balls tends to agitate the dry lubricant and distribute it uniformly throughout the tube.

Modifications may be made in the sizes and proportions of the parts as found necessary or desirable in adapting the invention to various types of vehicles and the loads to be sustained, and any suitable lubricating material may be substituted for the powdered graphite.

I claim:—

1. In a tire, a shoe, a series of hollow elastic balls arranged annularly therein, each having perforations extending from the exterior to the interior thereof, and a comminuted dry lubricant in the interstices between said balls.

2. In a tire, a shoe, an annular tube inclosed in said shoe, and a series of hollow elastic balls in said tube, in contact with each other and with the interior of said tube, each of said balls having a multiplicity of perforations extending from the exterior to the interior thereof.

3. In a tire, a shoe, an annular tube inclosed in said shoe, a series of hollow elastic balls in said tube, arranged annularly and in contact with each other and with the interior of said tube, each of said balls having perforations extending from the exterior to the interior thereof, and a comminuted dry lubricant in the interstices between said balls.

In testimony that I claim the invention above set forth I affix my signature.

THOMAS H. KIP.